(No Model.) 5 Sheets—Sheet 1.

R. CONNELL.
GRAIN SHOCKING MACHINE.

No. 517,095. Patented Mar. 27, 1894.

Witnesses:
Chas. Raley.
W. Noffke.

Robert Connell.
Inventor.
by A. Harvey
Attorney.

(No Model.) 5 Sheets—Sheet 2.
R. CONNELL.
GRAIN SHOCKING MACHINE.

No. 517,095. Patented Mar. 27, 1894.

Witnesses:
Chas. Raley.
W. Noffke.

Robert Connell
Inventor.
by A. Harvey
Attorney.

(No Model.) 5 Sheets—Sheet 3.

R. CONNELL.
GRAIN SHOCKING MACHINE.

No. 517,095. Patented Mar. 27, 1894.

Witnesses:
Chas. Raley.
W. Noffke.

Robert Connell,
Inventor.
by A. Harvey
Attorney.

(No Model.) 5 Sheets—Sheet 4.
R. CONNELL.
GRAIN SHOCKING MACHINE.

No. 517,095. Patented Mar. 27, 1894.

Witnesses:
Chas Raley
W. Noffke.

Robert Connell
Inventor.
by A. Harvey
Attorney.

(No Model.) 5 Sheets—Sheet 5.

R. CONNELL.
GRAIN SHOCKING MACHINE.

No. 517,095. Patented Mar. 27, 1894.

Witnesses:
Chas. Raley.
W. Noffke.

Robert Connell.
Inventor
by A. Harvey
Attorney.

UNITED STATES PATENT OFFICE.

ROBERT CONNELL, OF OSPREY, CANADA.

GRAIN-SHOCKING MACHINE.

SPECIFICATION forming part of Letters Patent No. 517,095, dated March 27, 1894.

Application filed March 6, 1893. Serial No. 464,818. (No model.)

*To all whom it may concern:*

Be it known that I, ROBERT CONNELL, of Osprey, in the Province of Manitoba, in the Dominion of Canada, have invented certain new and useful Improvements in Grain-Shocking Machines; and I do hereby declare that the following is a full, clear, and exact description of the same, reference being had to the accompanying drawings, forming a part hereof.

My invention, which will be hereinafter fully set forth and claimed, relates to machinery for shocking or stooking grain sheaves attachable to self-binding harvesters.

The object of my invention is an attachment to a self-binder that will automatically collect the sheaves, put them in shape and set them down on the ground upright, forming a conical shock or stook.

Figure 1:
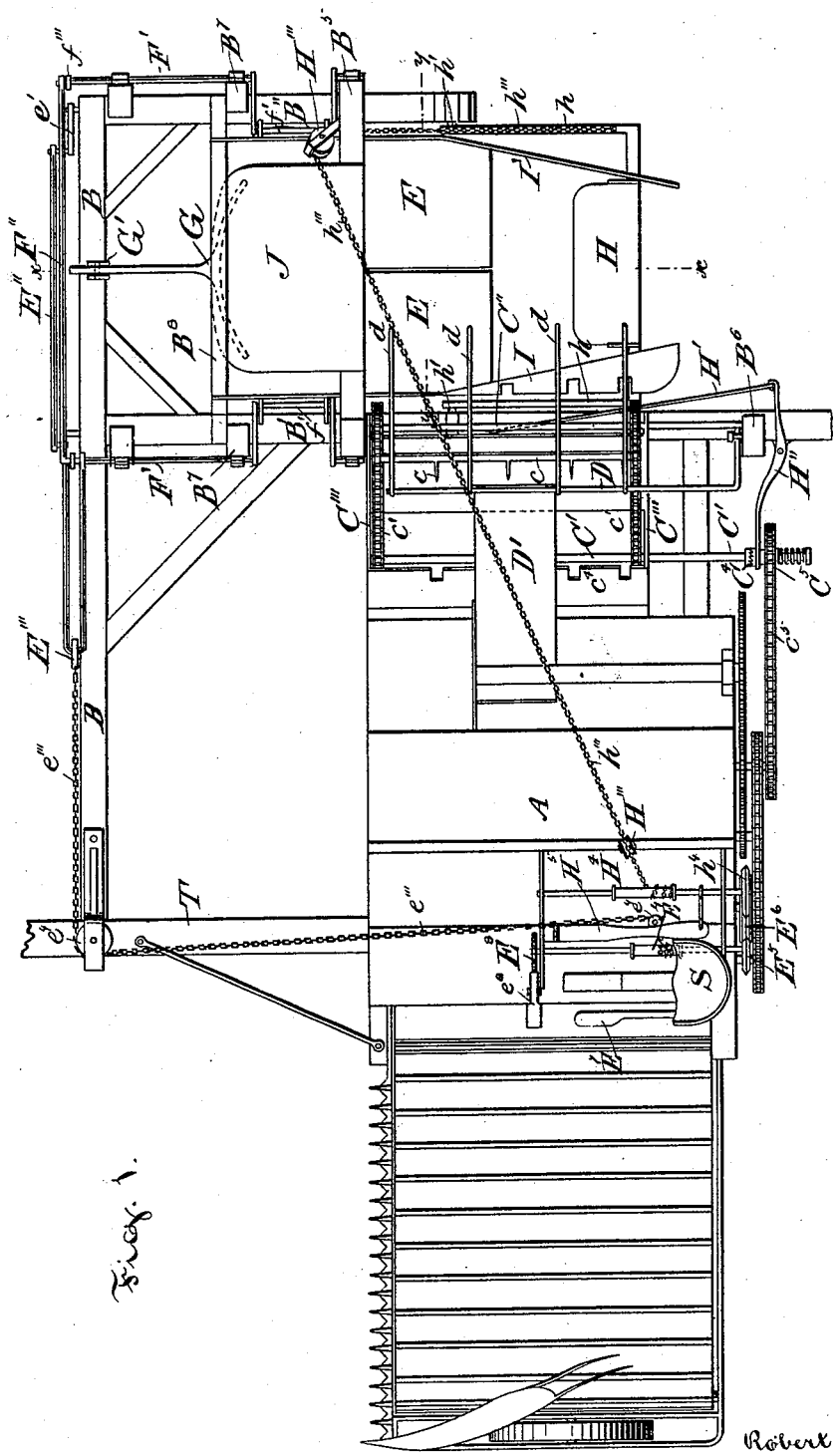
Figure 2:
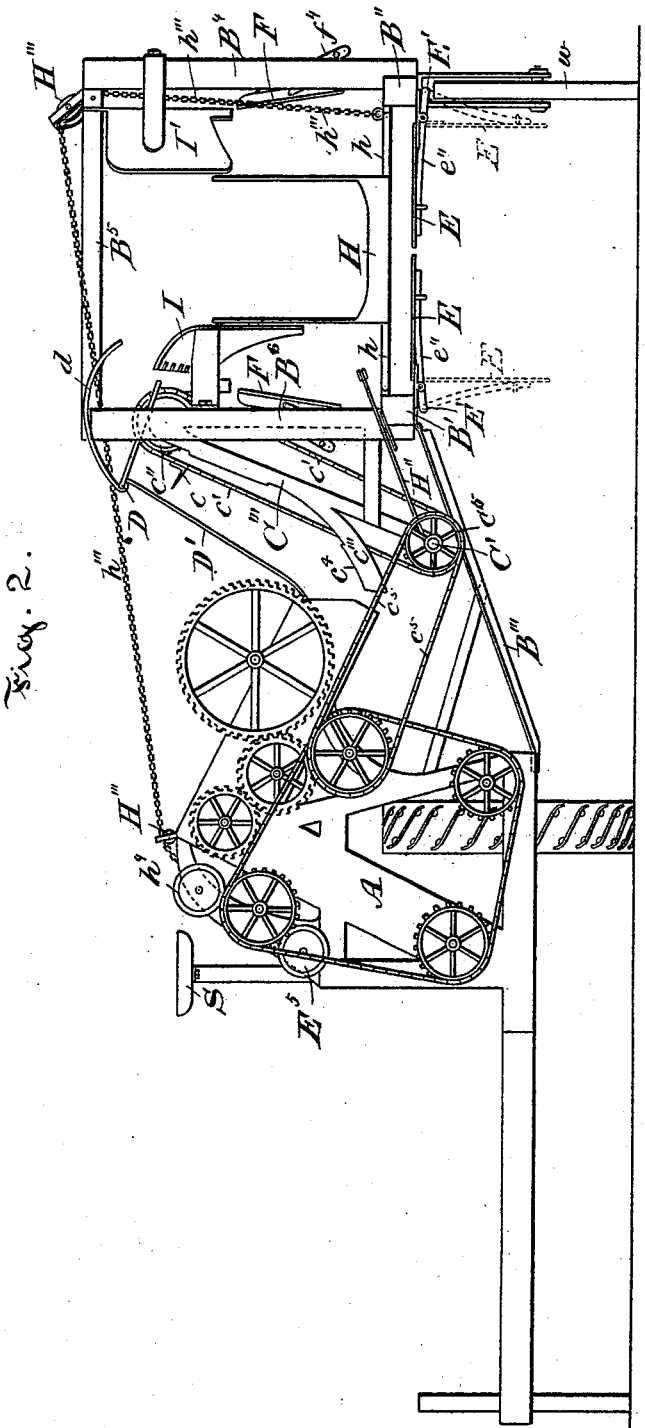
Figure 3:
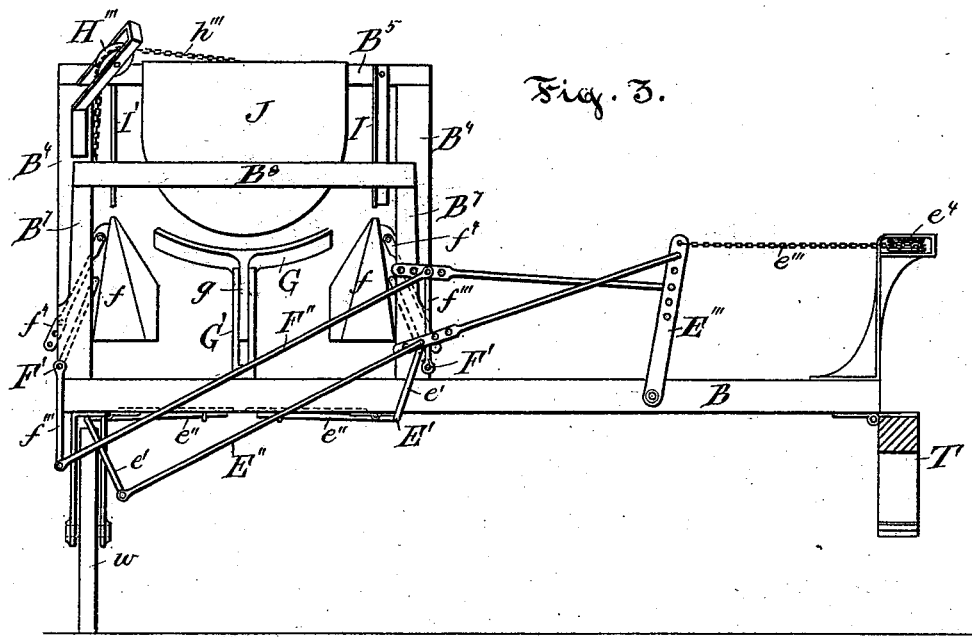
Figure 4:
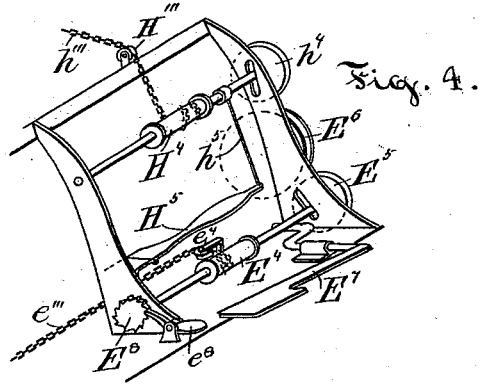
Figure 5:
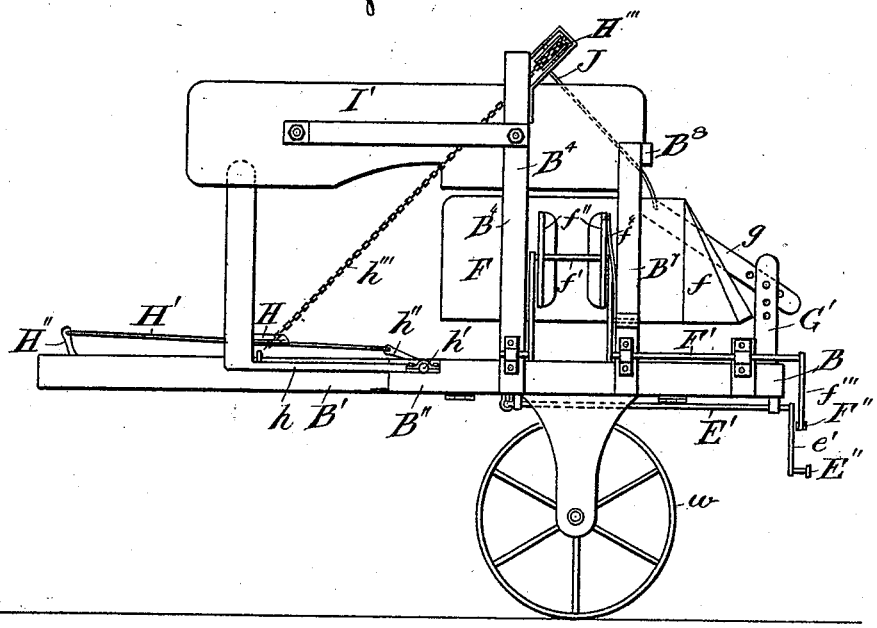
Figure 6:
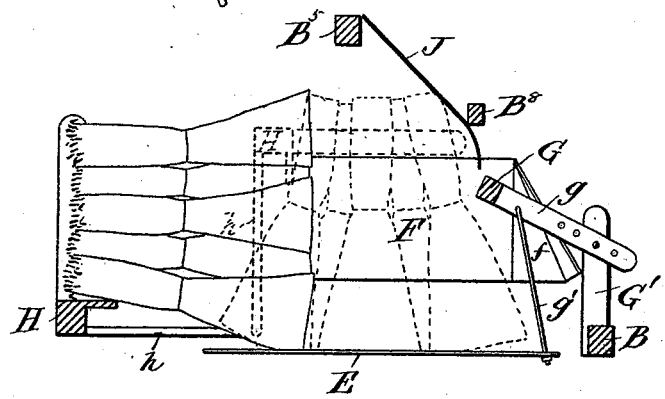
Figure 9:
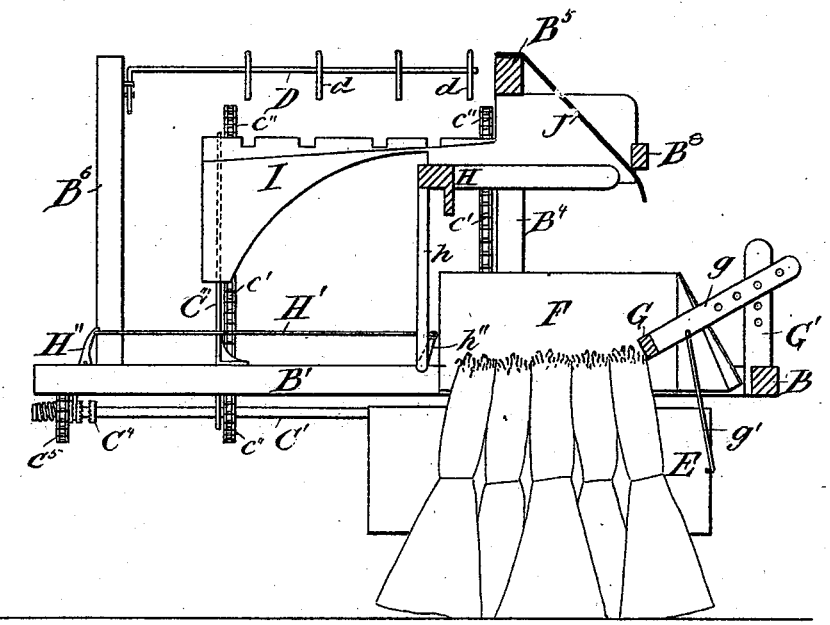
Figure 7:
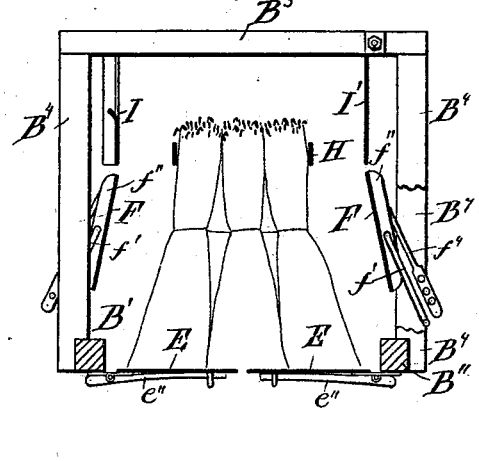
Figure 8:
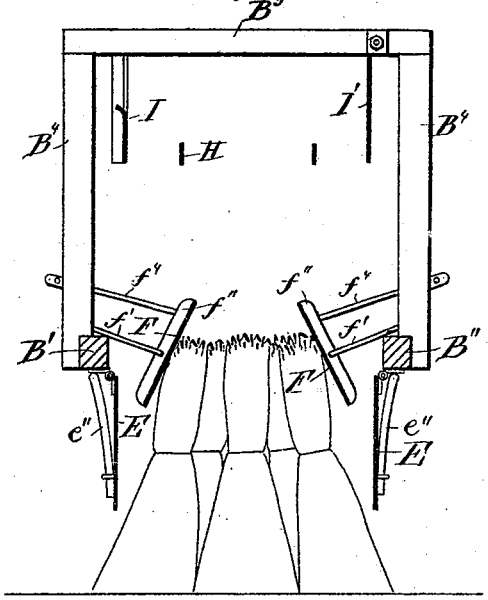

Figure 1 is a top view of my improved machine attached to a binder. Fig. 2 is a rear view of the same, the dotted lines showing the table down. Fig. 3 is a front view of the same, showing the table and wings up. Fig. 4 is a perspective view of a part of the binder mechanism, showing the attachment for operating the shocking attachment. Fig. 5 is a side view of the shocking attachment showing the same in position to receive sheaves. Fig. 6 is a section of the shocking attachment on line $x$ $x$ Fig. 1 parallel and corresponding to Fig. 5 and showing the sheaves required to make a shock gathered therein. Fig. 7 is a transverse section of the shocking attachment on line $y$ $y$ Fig. 1, showing the heads of the sheaves gathered therein raised and supported in an upright position, preparatory to being dumped. Fig. 8 is a corresponding section showing the sheaves dumped and the shock complete. Fig. 9 is a section corresponding to Figs. 5 and 6 but showing the position of the parts and the sheaves corresponding to Fig. 8 and showing the completed shock in side view.

To the regular self-binder A I attach an elevator and frame work adapted to carry the gathering, shaping and dumping device, carried upon an additional wheel $w$ under the extreme part of said frame. The latter consists of a cross bar B, Figs. 1 3 5 and 9 attached to the tongue T, and extending toward the delivery side and which carries the ends of the two sills B′ B″, the rear end of the inner one, B′, being supported by a braced arm B‴ from the binder frame and the other, being supported by the wheel $w$, is secured by connecting the upper ends of the two posts B⁴ by a cross piece B⁵. B⁶ is an additional post at the rear end of the sill B′ and the posts B⁷ and cross piece B⁸ form an additional bail in front of the bail B⁴ and B⁵, but smaller. The elevator, Figs. 1 and 2, consists of an endless elevator rake or fork, being an apron of spiked slats $c$ carried on pitch chains $c'$ running over sprocket wheels $c''$ on shafts C′ C″. These latter are journaled in frame ends C‴ which are supported on the sill B′, being of a triangular shape so as to give the apron a slanting position. The sheaves are received on a slanting shelf $c^4$ held by the arms $c'''$ on the ends C‴; said shelf is notched at the inner edge to allow the spikes of the slats $c$ to pass through and engage the sheaves. The lower shaft C′ is driven from the packer shaft of the binder by means of a pitch chain $c^5$ and sprocket wheel C⁵, the latter connected by a clutch C⁴, Figs. 1 and 2. A rod D, held by a flexible arm D′ secured to the binder, and slidingly supported on the post B⁶ by its end bent at a right angle near the top of the shaft C″, is provided with arms or guides $d$ curved to suit the sweep of the slats $c$ over the upper shaft C″, under which the sheaves must pass and be guided into the shocker.

The shocker proper consists of the table E, wings F, front fork G, and the sheaf carrier H together with the parts operating the same, also the two sides I and I′ acting as guides and the front end J acting as a butt for the sheaves.

The table, Figs. 1, 2, 7, 8 and 9, consists of two leaves hinged to the sills B′ and B″ and meeting in the center and each operated by a crank shaft E′ journaled to the sills B′ B″ and having an arm $e''$ engaging the leaf slidingly by a clevis or eye on the under side thereof, the cranked ends $e'$ standing respectively up and down in front, being connected by a coupling rod E″, Fig. 3, and by a pitman to a rocking lever E‴ pivoted to the cross bar B. This lever is controlled by a cord or chain $e'''$, Figs. 1, 2 and 3, suitably guided by a pulley or pulleys, such as $e^4$ and secured to a drum or shaft E⁴, under the driver's seat S, having a friction pulley $E^5$ gearing into the friction wheel $E^6$, Figs. 1, 2 and 4, and controlled by a foot lever $E^7$ which is provided with a crank adapted to lift the shaft $E^4$ and press the pulley $E^5$ into gear with the driver $E^6$. The other end of the drum or shaft $E^4$ is provided with a ratchet wheel $E^8$ engaged by a lever foot pawl $e^8$. Thus by depressing the foot lever $E^7$, the shaft $E^4$ is raised and the pulley $E^5$ is pressed against and geared with the driver $E^6$ which rotates the shaft $E^4$ and winds up the cord $e'''$. When the pressure on the lever ceases, the pawl $e^8$ holds the ratchet wheel $E^8$ and the shaft $E^4$. When it is desired to let the cord $e'''$ go, i. e. unwind from the shaft $E^4$, the pawl $e^8$ is disengaged from the ratchet $E^8$ by pressing it down with the foot, leaving the shaft $E^4$ free to rotate. The front end of the table leaves have pivoted to them rods $g'$ converging toward and pivoted to the arm or shank $g$ of the front fork G which is pivoted near its free end in a standard $G'$, Figs. 3, 5, 6 and 9, secured to the cross bar B, and provided with a series of holes for adjustment. The rising and falling of the leaves E will therefore also cause the rising and falling of the front fork G, as shown in Figs. 5, 6 and 9, said fork regulating the position of the heads of the sheaves.

The wings, F, Figs. 1 2 3 5 6 8 and 9, are rectangular plates or boards having their front ends $f$ beveled and bent inwardly, resembling a portion of a polygonal hip roof, as shown in Figs. 5 6 and 9, one on each side within the frame $B'$ $B''$ $B^4$ $B^5$ $B^7$ $B^8$ facing each other. Each is carried on the continuous crank arm $f'$ of a shaft $F'$ journaled on the outside of the posts $B^4$ $B^7$, said arms passing pivotally through transverse strips $f''$ at the back, and the front end $f'''$ extending beyond the cross bar B where one is cranked up and the other down, being connected by a coupling rod $F''$, Fig. 3, and by a pitman to the rocking lever $E'''$. It will thus be noted that the latter gives motion to both table and wings simultaneously. A parallel motion is given to the wings by pivoting an arm $f^4$ to the post $B^7$ and to the upper end of the strip $f''$, said arm $f^4$ being somewhat longer than the crank arm $f'$, so as to impart to the wings an inclined position. Said wings have the object to shape the tops of the shocks and give them a conical outline transversely.

The sheaf carrier H, Figs. 1 2 5 6 and 9, consists of a fork or head rest carried upon a bail $h$, the ends $h'$ of which are journaled upon the sills $B'$ and $B''$. One end, $h''$, is doubly cranked and has pivoted to it a rod $H'$ connecting it with the clutch lever $H''$, controlling the clutch $C^4$. Normally the bail $h$ rests in a horizontal position upon the sills $B'$ $B''$ and the clutch lever $H''$ holds the clutch $C^4$ in gear with the elevator shaft $C'$; when the bail $h$ is raised, the crank $h''$ and rod $H'$ shift the lever $H''$ which disengages the clutch $C^4$ causing the elevator shaft $C'$ to be at rest.

For raising the bail $h$, the cord or chain $h'''$ is secured to it, which is led by suitable pulleys, such as $H'''$, to the binder gear near the driver's seat S, its end being secured to the drum or shaft $H^4$. This latter carries a friction pulley $h^4$ adapted to gear into the friction wheel $E^6$ when being drawn down upon it by the rod $h^5$, attached to the foot lever $H^5$ the drum or shaft $H^4$, for that purpose, having the end carrying the friction pulley journaled in a slotted bearing. Thus, when it is desired to raise the sheaf carrier H, the foot lever $H^5$ is pressed down, thereby drawing down the rod $h^5$ and the geared end of the shaft $H^4$ bringing the friction pulley $h^4$ into gear with the friction wheel $E^6$. The latter rotates the pulley $h^4$ and shaft $H^4$ and the cord or chain $h'''$ is wound upon said shaft and the bail $h$ is raised and the clutch $C^4$ thrown out of gear, the elevator shaft $C'$ stopping. The heads of the sheaves, resting in the fork H, are thus raised and the sheaves brought into an upright position on the table E. The foot pawl $e^8$ may now be depressed and the ratchet wheel $E^8$ released and the shaft or drum $E^4$ permitted to uncoil the cord or chain $e'''$ wound upon it. This is readily effected by the weight of the sheaves resting upon the table which now opens and allows the sheaves to drop. Simultaneously with the leaves of the table dropping, the wings close in upon the heads of the sheaves and the front fork drops and presses and follows the heads, preventing them from falling forward.

A frame, consisting of side plates or boards I and $I'$, and an end plate or board J, secured to the bails $B^4$ $B^5$ and $B^7$ $B^8$ and post $B^6$ respectively, is formed at the top to receive the sheaves when delivered by the elevator and to guide them into the sheaf carrier and give a suitable outline to the shock. The plate or board I is set near the elevator and the upper edge bent over and notched to allow the spikes of the elevator rake to pass through.

I claim as my invention—

1. In a shocking attachment to self-binding harvesters, the combination with the harvester of a frame consisting of a cross bar attached to the tongue, sills having one end secured to said bar, a braced arm attached to the harvester supporting one of said sills, posts and cross pieces supported on and connecting said sills, a wheel carrying the extremity of said frame, a two leaved table opening laterally downward from the center and each operated by a crank on a shaft journaled to the sills and connected by a coupling rod and pitman to a rocking lever, side wings with curved front ends within the frame held inclined by a parallel motion and operated by cranks to move inwardly toward each other and downwardly by cranks on shafts journaled to the outside of the frame and connected at the front to the rocking lever above recited by means of a coupling rod and pitman, said lever connected by a cord or chain to a winding drum or shaft with friction pulley operated by a foot lever, ratchet wheel pawl and friction driving wheel, a front fork having the end of its shank pivoted to a standard on the front bar and pivotally connected to the table leaves by two rods, a sheaf carrier consisting of a fork secured to a bail the cranked ends of which are journaled transversely to the sills and adapted to be raised by means of a cord or chain led by a pulley or pulleys, a winding drum or shaft near the driver's seat to which the end of said cord is secured provided with a friction pulley, a foot lever putting said friction pulley into gear with the same friction wheel above recited, an elevator receiving the sheaves from the binder and delivering them upon the table and sheaf carrier above recited and consisting of two shafts with sprocket wheels carrying an endless chain with spiked slats and journaled at the ends of an inclined frame secured to the sills and one of said shafts receiving motion from the packer shaft of the binder by means of a chain and sprocket wheel connected thereto with a clutch controlled by a lever connected to the sheaf carrier and framing forming guides at the upper part of the main frame, substantially as set forth.

2. In an attachment to self binders, the combination of a cross bar, two sills having their forward ends secured to said cross bar, posts secured to said sills, cross pieces connecting said posts, two shafts journaled to said posts and having crank arms at each end, a coupling rod connecting the forward crank arms, a pitman connecting said rod with a rocking lever, and two wings parallel to said shafts and having the rear crank arm journaled therein and provided with a link to form a parallel motion, substantially as set forth.

3. In an attachment to self binders, the combination of a framing consisting of parallel sills carrying posts connected overhead at one end, the sheaf carrier consisting of a bail having cranks journaled transversely to said sills and a fork or head rest, the elevator consisting of spiked slats on endless chains running over sprocket wheels on shafts journaled in a frame supported on the inner sill, the sprocket wheel on the lower elevator shaft, a clutch connecting said wheel with the shaft, a lever controlling said clutch and a rod connecting said lever with an arm on the inner crank of the sheaf carrier bail, substantially as set forth.

4. In an attachment to self binders, the combination of a cross bar, two sills attached thereto at one end a distance apart, a wheel supporting the outer sill, a braced arm supporting the inner one, posts and cross pieces connecting said sills at the top, two shafts E' journaled to said sills each having a crank arm $e''$ at the inner end and a crank $e'$ at the outer end standing in opposite directions, a coupling rod E'' connecting said cranks and a pitman connecting one of the cranks to an operating rocking lever pivoted to said cross bar and two table leaves E each hinged to one of said sills parallel to said shafts slidingly connected to and operated by one of said crank arms $e''$, so as to allow them to drop from their normal horizontal to a temporary vertical position, substantially as set forth.

5. In an attachment to self binders, the combination with the main machine of a cross bar B, a rocking lever E''' pivoted thereto, a cord or chain $e'''$ secured to said lever, a winding drum or shaft $E^4$ having one end of said cord or chain secured to it and being journaled at one end in a movable bearing, a friction pulley $E^5$ at the movable end of said shaft, a ratchet wheel $E^8$ at the stationary end of said shaft, a foot lever pawl $e^8$ gearing in said ratchet wheel, a foot lever $E^7$ with crank adapted to lift the movable end of said shaft and a friction wheel $E^6$ receiving motion from the main gear of the machine with which the pulley $E^5$ is brought into contact by the crank of the foot lever, substantially as set forth.

6. In an attachment to self binders, the combination of a cross bar, two sills each having its forward end secured to said cross bar, two table leaves hinged to said sills, a post on said cross bar, a fork G having its shank pivoted to said post, rods $g'$ connecting the front end of said table leaves to the shank of said fork pivotally and mechanism for raising and depressing said leaves, substantially as set forth.

7. In an attachment to self binders, the combination with the framing and mechanism of the binder, of a friction wheel $E^6$ receiving motion from the binder mechanism, a winding drum or shaft $H^4$ journaled in a sliding bearing at one end, a friction pulley $h^4$ at the movable end of said shaft adapted to gear with said friction wheel $E^6$, a foot lever $H^5$ connected with the shaft $H^4$ at its movable end and adapted to draw the friction pulley at the end of it into contact with the wheel $E^6$, a cord or chain $h'''$ having one end secured to said drum or shaft $H^4$ and the other to a bail, two sills B' and B'' carried on a cross bar secured to the tongue and by a wheel $w$, a sheaf carrier consisting of a head rest H and bail $h$ having the shank ends $h'$ cranked and journaled transversely to said sills and one of said shanks connected with the cord or chain $h'''$, the crank $h''$ at one of the crank ends $h'$, the clutch $C^4$ on the elevator shaft, a driving wheel $C^5$ on said shaft engaged by said clutch, a lever H'' operating said clutch and connecting rod H connecting said lever with the cranked bail end $h''$, substantially as set forth.

8. In an attachment to self binders, the combination with the framing and mechanism of the binder of a cross bar secured to the tongue, the sills B' and B'' secured to the bar and supported by a braced arm B''' and wheel $w$, the posts and connecting pieces $B^4$ $B^5$ and $B^6$, the triangular frame ends C'''' supported by the sill B′, slanting notched shelf $c^4$ supported on arms $c'''$ on said frame ends, shafts C′ and C″ journaled in the ends of said frame ends, sprocket wheels $c''$ on said shafts, endless pitch chains $c'$ carrying spiked slats $c$ running over said sprockets, a driving wheel $C^5$ loose on the lower elevator shaft C′, the clutch $C^4$ engaging said driving wheel, the lever H″ controlling said clutch, the connecting rod H′ connecting said lever with the sheaf carrier, the sheaf guide D D′ $d$ held flexibly over the chains $c$ $c'$ and the delivery guides I and I′ secured to the posts $B^4$ and $B^6$, substantially as set forth.

In testimony whereof I have signed in the presence of the undersigned witnesses.

ROBERT CONNELL.

Witnesses:
A. HARVEY,
A. TROWSE.